United States Patent
Natu et al.

(10) Patent No.: US 11,586,457 B2
(45) Date of Patent: Feb. 21, 2023

(54) LOAD BALANCING IN A HYPER-CONVERGED INFRASTRUCTURE (HCI) ENVIRONMENT

(71) Applicant: EMC IP Holding Company LLC, Hopkinton, MA (US)

(72) Inventors: Gajanan S. Natu, Cary, NC (US); Kenneth Hu, Lexington, MA (US); Susan Young, Needham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 361 days.

(21) Appl. No.: 16/743,118

(22) Filed: Jan. 15, 2020

(65) Prior Publication Data

US 2021/0216345 A1 Jul. 15, 2021

(51) Int. Cl.
*G06F 9/455* (2018.01)
*G06F 3/06* (2006.01)

(52) U.S. Cl.
CPC .......... *G06F 9/45558* (2013.01); *G06F 3/061* (2013.01); *G06F 3/0647* (2013.01); *G06F 3/0653* (2013.01); *G06F 3/0673* (2013.01); *G06F 2009/4557* (2013.01); *G06F 2009/45579* (2013.01); *G06F 2009/45583* (2013.01)

(58) Field of Classification Search
CPC .... G06F 9/45558; G06F 3/061; G06F 3/0647; G06F 3/0653; G06F 3/0673; G06F 2009/4557; G06F 2009/45579; G06F 2009/45583; G06F 9/4856; G06F 9/45533
USPC .......................................................... 718/1
See application file for complete search history.

(56) References Cited

U.S. PATENT DOCUMENTS

| | | |
|---|---|---|
| 9,830,105 B1 | 11/2017 | Tummala et al. |
| 9,933,957 B1 | 4/2018 | Cohen et al. |
| 10,678,576 B1 | 6/2020 | Taylor et al. |
| 11,194,569 B2 | 12/2021 | Yan et al. |

(Continued)

FOREIGN PATENT DOCUMENTS

JP 2015219908 A * 12/2015 ............... G06F 9/44

OTHER PUBLICATIONS

Zhang, Fei, "A Survey on Virtual Machine Migration: Challenges, Techniques, and Open Issues", 2018, IEEE Communications Surveys & Tutorials, vol. 20, No. 2, pp. 1206-1243. (Year: 2018).*

*Primary Examiner* — Kenneth Tang
(74) *Attorney, Agent, or Firm* — BainwoodHuang

(57) ABSTRACT

Load balancing in a Hyper-Converged Infrastructure (HCI) environment, in which a compute migration request is received that indicates a virtual machine to be migrated, a source appliance in which the virtual machine is currently executing, and a destination appliance to which the virtual machine is to be moved by the requested compute migration. The technology determines whether performing the requested compute migration would cause the virtual machine to experience an increased remote data storage Input/Output (I/O) performance penalty as a result of moving the virtual machine to the destination appliance. The disclosed technology may prevent the requested compute migration from being performed in response at least in part to a determination that the requested compute migration would cause the virtual machine to experience an increased remote data storage I/O performance penalty as a result of moving the virtual machine to the destination appliance.

8 Claims, 7 Drawing Sheets

REMOTE DATA STORAGE I/O PERFORMANCE PENALTY
TABLE 600
(e.g. for VM-1 140)

| | 602 | 604 | 606 | 608 | 610 |
|---|---|---|---|---|---|
| | VM-1's Comp. Loc. | Local Volumes | Remote Volumes | Remote Throughput | Remote IO penalty (RP) |
| 612 → | A1 | A1V1, A1V2, A1V3 | A2V4 | TP4 | $RP_{A1}=(TP4)/S1$ |
| 614 → | A2 | A2V4 | A1V2, A1V2, A1V3 | TP1+TP2+TP3 | $RP_{A2}=(TP1+TP2+TP3)/S2$ |
| 616 → | A3 | - | A1V2, A1V2, A1V3, A2V4 | TP1+TP2+TP3+TP4 | $RP_{A3}=(TP1+TP2+TP3+TP4)/S3$ |

(56) References Cited

U.S. PATENT DOCUMENTS

| | | | | |
|---|---|---|---|---|
| 2012/0174104 | A1* | 7/2012 | Neogi | G06F 1/3203 |
| | | | | 718/1 |
| 2015/0234617 | A1* | 8/2015 | Li | G06F 3/0617 |
| | | | | 711/114 |
| 2017/0090972 | A1* | 3/2017 | Ryu | G06F 9/45558 |
| 2017/0366606 | A1* | 12/2017 | Ben-Shaul | G06F 3/0683 |
| 2019/0286475 | A1* | 9/2019 | Mani | G06F 9/45558 |
| 2020/0201661 | A1* | 6/2020 | Chou | G06F 3/061 |
| 2020/0210069 | A1* | 7/2020 | Singh | G06F 9/45558 |

* cited by examiner

APPLIANCE TO
PORT SPEED AND
STORAGE VOLUMES
ASSOCIATION
TABLE 400

| Appliance ID | Port Speed (bps) | Volumes |
|---|---|---|
| A1 | S1 | A1V1, A1V2, A1V3 |
| A2 | S2 | A2V4 |
| A3 | S3 | - |
| ... | ... | ... |

402 → Appliance ID
404 → Port Speed (bps)
406 → Volumes
408 → A1 row
410 → A2 row
412 → A3 row

Fig. 4

THROUGHPUT
BY STORAGE VOLUME
TABLE 500

| Volume $\rightarrow$ 502 | Throughput (bps) (TP) $\rightarrow$ 504 |
|---|---|
| A1V1 | TP1 |
| A1V2 | TP2 |
| A1V3 | TP3 |
| A2V4 | TP4 |
| ... | ... |

REMOTE DATA STORAGE I/O PERFORMANCE PENALTY
TABLE 600
(e.g. for VM-1 140)

| VM-1's Comp. Loc. | Local Volumes | Remote Volumes | Remote Throughput | Remote IO penalty (RP) |
|---|---|---|---|---|
| A1 | A1V1, A1V2, A1V3 | A2V4 | TP4 | $RP_{A1} = (TP4)/S1$ |
| A2 | A2V4 | A1V2, A1V2, A1V3 | TP1+TP2+TP3 | $RP_{A2} = (TP1+TP2+TP3)/S2$ |
| A3 | - | A1V2, A1V2, A1V3, A2V4 | TP1+TP2+TP3 +TP4 | $RP_{A3} = (TP1+TP2+TP3+TP4)/S3$ |

Fig. 6

LOAD BALANCING IN A HYPER-CONVERGED INFRASTRUCTURE (HCI) ENVIRONMENT

TECHNICAL FIELD

The present disclosure relates generally to load balancing in a Hyper-Converged Infrastructure (HCI) environment, and more specifically to techniques for integrating appliance-specific remote data storage I/O penalties for a virtual machine into compute load balancing that is performed across HCI appliances within an HCI environment.

BACKGROUND

A hyper-converged infrastructure ("HCI") environment is an information technology infrastructure that provides both processor resources (aka "compute resources") and non-volatile data storage resources from multiple, interconnected HCI appliances that may be managed together as a cluster of HCI appliances. Each appliance in the cluster may include processor and/or non-volatile data storage resources, together with memory and communication interfaces. The appliances in the cluster may be interconnected by one or more computer networks, such as a Local Area Network (LAN) or other specific type of computer network. Each appliance in the cluster may be capable of performing compute and/or storage services.

A hypervisor in each HCI appliance executes some number of virtual machines located in that appliance. The hypervisor is responsible for sharing the processor resources of the appliance among the virtual machines that are contained within the appliance. Non-volatile data storage is allocated from non-volatile data storage resources within the cluster of appliances to each individual virtual machine as needed to meet the non-volatile data storage needs of that virtual machine.

SUMMARY

Load balancing in an HCI environment may include performing "compute migrations" of virtual machines between HCI appliances. Compute migrations of virtual machines may be performed to balance the utilization of processor resources across different appliances. In a compute migration of a virtual machine, the virtual machine is removed from the memory of one appliance having relatively heavily utilized processor resources (referred to herein as the "source appliance"), and loaded into and subsequently executed on another appliance having relatively lightly utilized processor resources (referred to herein as the "destination appliance"). The non-volatile data storage allocated to the virtual machine at the time that the virtual machine is migrated is not changed during a compute migration, in order to avoid having to move the virtual machine's data, so that the total amount of time and resources required to perform the compute migration is limited. The time required during the compute migration to move the executable virtual machine from the memory of the source appliance into the memory of the destination appliance is relatively short. In contrast, moving the virtual machine's data is advantageously avoided during the compute migration, because the amount of time that would be required to move the virtual machine's data from one set of non-volatile data storage to a different set of non-volatile data storage could be very long.

Non-volatile data storage may be allocated to a virtual machine in one or more logical storage volumes. Each storage volume is contained within a single appliance, and specific portions of the storage volume may be accessed by a virtual machine to which the storage volume is allocated using logical addresses or offsets within the logical address space of the storage volume. Addresses or offsets within the logical address space of a storage volume are mapped (e.g. by mapping program code in the appliance that contains the storage volume) to portions of physical non-volatile data storage located in one or more non-volatile data storage devices (e.g. solid state drives, magnetic disk drives, etc.) that are contained in the same appliance that contains the storage volume. Data written by a virtual machine to a storage volume is accordingly stored into and subsequently accessed from portions of physical non-volatile storage that are contained within one or more non-volatile data storage devices that are contained in (e.g. directly attached to) the same appliance that contains the storage volume.

A storage volume allocated to a virtual machine may be contained in the same appliance that contains the virtual machine, or in a different appliance within the cluster. A storage volume that is contained in the same appliance that contains the virtual machine to which it is allocated provides a relatively low data transfer latency for accesses (e.g. read I/O operations and write I/O operations) by that virtual machine to the data that it stores, since the physical non-volatile data storage device or devices to which the storage volume is mapped is/are contained in (e.g. directly attached to) the same appliance that executes the virtual machine that accesses the storage volume. A storage volume that is contained in the same appliance that executes the virtual machine to which it is allocated is referred to herein as a "local" storage volume of that virtual machine, and the storage I/O (Input/Output) operations (e.g. read I/O operations and write I/O operations) performed by that virtual machine to access the data stored in the storage volume are referred to herein as "local storage I/O operations".

In contrast, a storage volume contained in an appliance that is different from the appliance that contains the virtual machine to which it is allocated will generally provide a relatively high data transfer latency for accesses (e.g. read I/O operations and write I/O operations) by that virtual machine to the data that it stores, since storage operations (e.g. read I/O operations and write I/O operations) performed by the virtual machine on the storage volume must traverse the computer network that interconnects the two appliances. A storage volume contained in an appliance other than the appliance that contains the virtual machine to which it is allocated is referred to as a "remote" storage volume of that virtual machine, and the storage I/O operations (e.g. read I/O operations and write I/O operations) performed by the virtual machine to access the data stored in such a storage volume are referred to as "remote storage I/O operations".

Within the set of storage volumes that are allocated to a virtual machine, the categorization of which storage volumes are local to the virtual machine and which storage volumes are remote to the virtual machine depends on which specific appliance contains and executes the virtual machine. Accordingly, migrating a virtual machine between appliances may change one or more of the storage volumes allocated to the virtual machine from local storage volumes into remote storage volumes, and vice versa. For example, the number of storage volumes allocated to a virtual machine that are remote storage volumes for that virtual machine may increase as a result of migrating the virtual machine. An increase in the number of remote storage volumes allocated to the virtual machine may result in the virtual machine experiencing an increased overall level of data storage latency. When the data storage latency experienced by the virtual machine is increased by a compute migration, the benefit obtained by the migration in terms of processor resource load balancing may be diminished or even outweighed by the increase in data storage latency.

In some systems, the hypervisor performing load balancing by way of performing compute migrations on virtual machines may view non-volatile data storage only as a single virtualized resource, and accordingly have no awareness of the specific appliances that contained the storage volumes that were allocated to a given virtual machine. The compute migrations of virtual machines performed by such hypervisors have therefore been "compute centric", in that they may be based only on the relative loading of processor resources in different appliances. Because the impact of the migration on storage latency cannot be considered, such compute centric virtual load balancing performed by these hypervisors could result in a reduced overall level of performance for the virtual machine. For example, in the case where the storage volumes allocated to a virtual machine are all contained in the source appliance from which the virtual machine is compute migrated, the compute migration changes those storage volumes from local storage volumes to remote storage volumes, and therefore introduces additional network delay each time the virtual machine accesses any of its non-volatile data storage. Such additional data storage latency caused by the compute migration could diminish or outweigh the value of the performance improvement resulting from executing the virtual machine on the relatively less utilized processor resources on the destination appliance.

In order to address the above described and other technical shortcomings of previous technologies, new technology for load balancing is disclosed herein. In the disclosed technology, a compute migration request is received. The compute migration request indicates a virtual machine, a source appliance in which the virtual machine is currently executing, and a destination appliance to which the virtual machine is to be moved by the requested compute migration. The disclosed technology determines whether performing the requested compute migration would cause the virtual machine to experience an increased remote data storage Input/Output (I/O) performance penalty as a result of moving the virtual machine to the destination appliance. The disclosed technology prevents the requested compute migration from being performed in response at least in part to a determination that the requested compute migration would cause the virtual machine to experience an increased remote data storage I/O performance penalty as a result of moving the virtual machine to the destination appliance.

In some embodiments, the disclosed technology may determine whether performing the requested compute migration would cause the virtual machine to experience an increased remote data storage I/O performance penalty as a result of moving the virtual machine to the destination appliance at least in part by calculating a source remote data storage I/O performance penalty that is equal to a rate at which remote data storage I/O is performed by the virtual machine when the virtual machine is executing in the source appliance, calculating a destination remote data storage I/O performance penalty that is equal to a rate at which remote data storage I/O would be performed by the virtual machine as a result of moving the virtual machine to the destination appliance, and determining that performing the requested compute migration would cause the virtual machine to experience an increased remote data storage I/O performance penalty as a result of moving the virtual machine to the destination appliance in response at least in part to the destination remote data storage I/O performance penalty exceeding the source remote data storage I/O performance penalty.

In some embodiments, the disclosed technology may calculate the source remote data storage I/O performance penalty at least in part by identifying those storage volumes allocated to the virtual machine that are remote storage volumes of the virtual machine when the virtual machine is executing in the source appliance, and may calculate the destination remote data storage I/O performance penalty at least in part by identifying those storage volumes allocated to the virtual machine that would be remote storage volumes of the virtual machine as a result of moving the virtual machine to the destination appliance.

In some embodiments, the disclosed technology may monitor I/O throughput generated by the virtual machine to each storage volume allocated to the virtual machine. Calculating the source remote data storage I/O performance penalty may include calculating a total amount of I/O throughput generated by the virtual machine to those storage volumes allocated to the virtual machine that are remote storage volumes of the virtual machine when the virtual machine is executing in the source appliance. Calculating the destination remote data storage I/O performance penalty may include calculating a total amount of the I/O throughput generated by the virtual machine to those storage volumes allocated to the virtual machine that would be remote storage volumes of the virtual machine as a result of moving the virtual machine to the destination appliance.

In some embodiments in which the disclosed technology monitors the I/O throughput generated by the virtual machine to each storage volume allocated to the virtual machine, the disclosed technology may detect a maximum rate at which a network interface of the source appliance can transfer data onto the network that interconnects a plurality of appliances including the source appliance and the destination appliance. The disclosed technology may further detect a maximum rate at which a network interface of the destination appliance can transfer data onto the network. The source remote data storage I/O performance penalty may include or consist of a) the total amount of I/O throughput generated by the virtual machine to those storage volumes allocated to the virtual machine that are remote storage volumes of the virtual machine when the virtual machine is executing in the source appliance, divided by b) the maximum rate at which the network interface of the source appliance can transfer data onto the network. The destination remote data storage I/O performance penalty may include or consist of a) the total amount of I/O throughput generated by the virtual machine to those storage volumes allocated to the virtual machine that would be remote storage volumes of the virtual machine as a result of moving the virtual machine to the destination appliance, divided by b) the maximum rate at which the network interface of the destination appliance can transfer data onto the network.

In some embodiments the disclosed technology may determine a source compute latency that includes or consists of a compute latency experienced by the virtual machine when the virtual machine is executing on the source appliance. The disclosed technology may further determine a destination compute latency that includes or consists of a compute latency that would be experienced by the virtual machine as a result of moving the virtual machine to the destination appliance. The disclosed technology may then calculate a source performance index equal to a sum of the source compute latency and the source remote data storage I/O performance penalty, and calculate a destination performance index equal to a sum of the destination compute latency and the destination remote data storage I/O performance penalty. The disclosed technology may prevent the requested compute migration from being performed in response to the destination performance index exceeding the source performance index.

In some embodiments, the disclosed technology may further determine whether a requested compute migration is consistent with at least one policy provided for processing compute migration requests, and determine whether the requested compute migration should be permitted or prevented at least in part responsive to determining whether the requested compute migration is consistent with the at least one policy provided for processing compute migration requests.

Embodiments of the disclosed technology may provide significant improvements over previous technologies. For example, the disclosed technology may be embodied to provide a more holistic approach to performing compute migrations of virtual machines between appliances in an HCI environment. Specifically, the disclosed technology may allow for the detection and consideration of potentially increased data storage latency that may occur as a result of performing a requested compute migration. The disclosed technology operates such that a requested compute migration of a virtual machine may be prevented in the case where performing the requested compute migration would result in an increased overall level of data storage latency for the migrated virtual machine. The disclosed technology advantageously may operate in response to the specific physical topology of the HCI environment, including the physical location(s) of the non-volatile data storage that is allocated to a virtual machine. The disclosed technology may advantageously operate in response to a specific topology of the HCI environment by preventing a requested compute migration for a virtual machine in which the processor resource load balancing benefit may be diminished or outweighed by an increase in the data storage latency that would be experienced by the virtual machine after the requested compute migration.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram showing an example of an appliance to port speed and storage volumes association table in some embodiments;

FIG. 5 is a block diagram showing an example of a throughput by storage volume table in some embodiments;

FIG. 6 is a block diagram showing an example of a remote data storage I/O performance penalty table in some embodiments.

DETAILED DESCRIPTION

Embodiments of the invention will now be described. The embodiments described herein are provided only as examples, in order to illustrate various features and principles of the invention. The present invention is broader than the specific embodiments described herein.

The technology disclosed herein may be embodied to provide improvements over previous technologies by determining whether performing a requested compute migration would cause a virtual machine to experience an increased remote data storage Input/Output (I/O) performance penalty as a result of moving the virtual machine from a source appliance to a destination appliance. The disclosed technology may prevent the requested compute migration from being performed in response to a determination that the requested compute migration would cause the virtual machine to experience an increased remote data storage I/O performance penalty as a result of moving the virtual machine to the destination appliance, and/or in response to a determination that the combined compute and storage latency experienced by the virtual machine would increase as a result of moving the virtual machine to the destination appliance due to the increased remote data storage I/O performance penalty.

Figure 1:
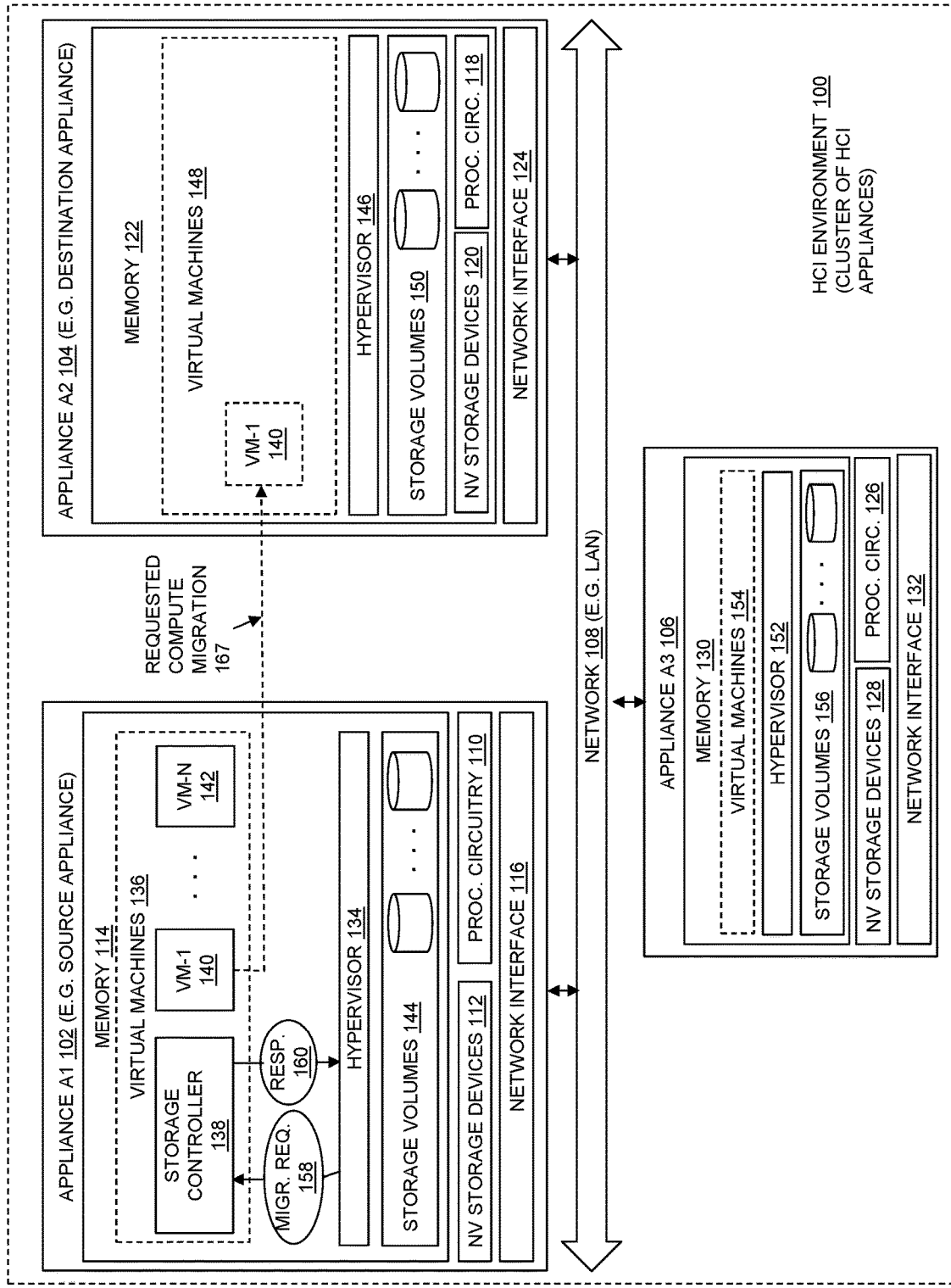
FIG. 1 is a block diagram showing an example of an HCI environment including multiple HCI appliances communicably interconnected by a network, and showing a requested compute migration of a virtual machine that may be prevented by operation of a storage controller executing in one or more of the HCI appliances in some embodiments.

FIG. 1 is a block diagram showing an example of an HCI Environment 100 including multiple HCI appliances, e.g. Appliance A1 102, Appliance A2 104, and Appliance A3 106. The appliances in HCI Environment 100 are communicably interconnected by a Network 108, which may consist of or include a Local Area Network (LAN) or some other specific type of network or networks.

Each of the appliances in HCI Environment 100 includes processing circuitry (also referred to as "processing resources"), such as one or more microprocessors or the like that execute program code (e.g. executable instructions) stored in the memory of the appliance, and that process data based on and/or resulting from the execution of the program code. For example, Appliance A1 102 contains Processing Circuitry 110, Appliance A2 104 contains Processing Circuitry 118, and Appliance A3 106 contains Processing Circuitry 126.

Each of the appliances in HCI Environment 100 also includes computer memory that stores program code that is executable on the processing circuitry of the appliance. The memory in each appliance may, for example, include or consist or Dynamic Random Access Memory (DRAM) and/or some other specific type of computer memory. For example, Appliance A1 102 contains Memory 114, Appliance A2 104 contains Memory 122, and Appliance A3 106 contains Memory 106.

Each of the appliances in HCI Environment 100 includes one or more non-volatile data storage devices that operate to persistently store data. The non-volatile data storage devices contained in an appliance may, for example, include or consist of flash memory (e.g. solid-state drives), and/or magnetic storage devices (e.g. hard disk drives), and/or some other specific type of non-volatile data storage devices that are contained in and/or directly attached to the appliance, such that accessing the persistently stored data in the non-volatile data storage devices by any virtual machine contained in the same appliance does not require traversing Network 108. For example, Appliance A1 102 contains Non-Volatile Storage Devices 112, Appliance A2 104 contains Non-Volatile Storage Devices 120, and Appliance A3 106 contains Non-Volatile Storage Devices 218.

Each of the appliances in HCI Environment 100 further includes one or more network interfaces through which the appliance communicates with other appliances over the Network 108. Each network interface may, for example, include or consist of one or more network interface controllers (NICs) or the like. For example, Appliance A1 102 contains Network Interface 116, Appliance A2 104 contains Network Interface 124, and Appliance A3 106 contains Network Interface 132.

Further in the HCI Environment 100, the program code stored in the memory of each appliance includes a hypervisor that runs some number of virtual machines also stored in the memory of that appliance. Accordingly, the hypervisor in each appliance shares the processing resources of the appliance among the virtual machines that are contained in the same appliance. For example, Appliance A1 102 contains Hypervisor 134 that executes Virtual Machines 136, Appliance A2 104 contains Hypervisor 146 that executes Virtual Machines 148, and Appliance A3 106 contains Hypervisor 152 that executes Virtual Machines 154.

Each appliance in HCI Environment 100 may include one or more logical storage volumes of non-volatile data storage. In the example of FIG. 1, Appliance A1 102 contains Storage Volumes 144, Appliance A2 104 contains Storage Volumes 150, and Appliance A3 106 contains Storage Volumes 150. Each storage volume provides non-volatile data storage to a virtual machine to which it is allocated. Each storage volume has a logical address space, and is accessed by the virtual machine to which it is allocated through I/O operations (e.g. read I/O operations and/or write I/O operations) that are directed to the logical volume and that specify logical addresses or offsets within that logical address space. In this way, non-volatile data storage may be allocated to each one of the virtual machines executing in the appliances of HCI Environment 100 in one or more storage volumes. In some embodiments and/or configurations, the storage volume or volumes that are allocated a given virtual machine are only accessible to that virtual machine, and are exclusively used by only that virtual machine.

The addresses and/or offsets within the logical address space of a storage volume are mapped by the storage volume and/or execution of associated program code instructions to portions of physical non-volatile data storage that are allocated to that storage volume. In some embodiments, portions of physical non-volatile data storage allocated to a storage volume may only be located on the non-volatile data storage devices that are contained within the same appliance that contains the storage volume. Accordingly, in the example of FIG. 1, portions of physical non-volatile data storage allocated to any storage volume in Storage Volumes 144 are all located in the Non-Volatile Data Storage Devices 112, portions physical non-volatile data storage allocated to any storage volume in Storage Volumes 150 are all located in Non-Volatile Data Storage Devices 120, and portions of physical non-volatile data storage allocated to any storage volume in Storage Volumes 156 are all located in Non-Volatile Data Storage Devices 128. As a result, data written to any individual storage volume is always stored into and subsequently accessed from portions of the physical non-volatile storage devices that are contained within (e.g. directly attached to) the same appliance that contains the storage volume. For example, data written to any storage volume within Storage Volumes 144 is stored into and subsequently accessed from portions of Non-Volatile Storage Devices 112, data written to any storage volume within Storage Volumes 150 is stored into and subsequently accessed from portions of Non-Volatile Storage Devices 120, and data written to any storage volume within Storage Volumes 156 is stored into and subsequently accessed from portions of Non-Volatile Storage Devices 128.

A storage volume allocated to a virtual machine may be contained in the same appliance that executes the virtual machine, or in a different appliance within the HCI Environment 100. When a storage volume is contained in the same appliance that executes the virtual machine to which it is allocated, that storage volume provides a relatively low data transfer latency for accesses (e.g. read I/O operations and write I/O operations) by that virtual machine to the data stored in the storage volume, since the physical non-volatile data storage device or devices to which the storage volume is mapped is/are directly attached to the same appliance that executes the virtual machine. Such storage volumes are referred to herein as "local" storage volumes, and the storage I/O (e.g. read I/O operations and write I/O operations) performed to access the data stored in the storage volume are referred to herein as "local data storage I/O".

When a storage volume is contained in an appliance that is different from the appliance that contains the virtual machine to which it is allocated, that storage volume provides a relatively high data transfer latency for accesses (e.g. read I/O operations and write I/O operations) to the data that it stores, since storage operations (e.g. read I/O operations and write I/O operations) performed by the virtual machine on the storage volume must use the network interface of the appliance that contains the virtual machine to traverse Network 108. Such storage volumes are referred herein to as a "remote" storage volumes, and the storage I/O operations (e.g. read I/O operations and write I/O operations) performed by the virtual machine to access the data stored in the storage volume are referred to as "remote data storage I/O".

During operation of the components shown in FIG. 1, one or more of the hypervisors may monitor the utilization of the processing resources contained in the individual appliances. For example, one or more of the hypervisors may monitor the level of utilization of Processing Circuitry 110, Processing Circuitry 118, and Processing Circuitry 126. As a result of such processing resource utilization monitoring, and of communication between the hypervisors over Network 108, one or more of the hypervisors may detect an imbalance between the utilization of processing resources in different appliances. For example, Hypervisor 134 and/or Hypervisor 146 may detect that Processing Circuitry 118 in Appliance A2 104 is less utilized than Processing Circuitry 110 in Appliance A1 102. In response to detecting such a load imbalance between the processing resources of Appliance A1 102 and Appliance A2 104, Hypervisor 134 may select one of the virtual machines contained in Appliance A1 102 for a possible compute migration of that virtual machine to Appliance A2 104. For example, Virtual Machines 136 in Memory 114 may include VM-1 140 through VM-N 142, and Hypervisor 134 may select VM-1 140 for a possible compute migration to Appliance A2 104, in order to attempt to improve the load balancing between the processing resources in Appliance A1 102 and Appliance A2 104. If performed, a compute migration that moves VM-1 140 from Appliance A1 102 to Appliance A2 104 would cause the executable program instructions of VM-1 140 to be removed from Appliance A1 102, moved to Appliance A2 104, and then subsequently executed in Appliance A2 104 by Hypervisor 146 on Processing Circuitry 118. Such a compute migration of VM-1 140 from Appliance A1 102 to Appliance A2 104 would not change the location(s) of the specific storage volume(s) that are allocated to VM-1 140.

Because Hypervisor 134 has no internal logic for determining the potential impact on data storage latency of performing a compute migration of VM-1 140 to Appliance A2 104, before performing such a compute migration Hypervisor 134 issues a request to storage controller logic executing in one or more of the appliances in HCI Environment 100, shown for purposes of illustration by Storage Controller 138. Storage Controller 138 stores and/or has access to the topology of HCI Environment 100 in terms of the specific appliances that contain the specific storage volumes that are allocated to VM-1 140, as well as other relevant data storage information described below. For example, Hypervisor 134 may issue a Compute Migration Request 158 to Storage Controller 138, requesting that Storage Controller 138 analyze the performance impact of performing a compute migration of VM-1 140 from Appliance A1 102 to Appliance A2 104, considering the potential impact on data storage latency for VM-1 140. Based on the analysis Storage Controller 138 may either permit or prevent the requested compute migration of VM-1 140 from Appliance A1 102 to Appliance A2 104.

Storage Controller 138 may, for example, consist of or include a virtual machine within Virtual Machines 136. The Compute Migration Request 158 may include an indication (e.g. identifier) of VM-1 140 as the virtual machine to be migrated, and an indication (e.g. identifier) of Appliance A1 102 as the appliance on which VM-1 140 is currently executing, thus indicating that Appliance A1 102 is the source appliance for the compute migration that is requested by Compute Migration Request 158. Compute Migration Request 158 may further include an indication (e.g. identifier) of Appliance A2 104 as the destination appliance for the requested compute migration, to which the virtual machine is to be moved by the compute migration requested by Compute Migration Request 158. Compute Migration Request 158 may further include additional information that may be used by Storage Controller 138 when processing Compute Migration Request 158. The compute migration that is requested by Compute Migration Request 158 is shown for purposes of illustration by Requested Compute Migration 167.

While for purposes of illustration Storage Controller 138 is shown in FIG. 1 as a single virtual machine executing in Appliance A1 102, Storage Controller 138 may alternatively execute on another one of the appliances in HCI Environment 100. In some embodiments Storage Controller 138 may be distributed across multiple appliances in HCI Environment 100. For example, in some embodiments, Storage Controller 138 may be embodied as a master storage controller executing in one of the appliances, and multiple slave storage controllers (e.g. virtual machines) executing in other ones of the appliances in HCI Environment 100. In such embodiments, the slave storage controllers may provide relevant data storage performance information from their respective appliances to the master Storage Controller 138 so that the master Storage Controller 138 can process compute migration requests received from the hypervisors in the cluster based on a full set of data storage performance information for all the appliances in HCI Environment 100.

Storage Controller 138 may operate in response to receipt of Compute Migration Request 158 by determining whether performing Requested Compute Migration 167 would cause VM-1 140 to experience an increased remote data storage I/O performance penalty as a result of moving VM-1 140 from Appliance A1 102 to Appliance A2 104. Storage Controller 138 may then prevent Requested Compute Migration 167 from being performed in response at least in part to a determination that the Requested Compute Migration 167 would cause VM-1 140 to experience an increased remote data storage I/O performance penalty as a result of moving VM-1 140 Appliance A2 104. For example, in response to determining that Requested Compute Migration 167 would cause VM-1 140 to experience an increased remote data storage I/O performance penalty as a result of moving VM-1 140 Appliance A2 104, Storage Controller 138 may issue a Response 160 to Hypervisor 134 that prevents Hypervisor 134 from performing Requested Compute Migration 167. As a result of the requested compute migration being prevented, VM-1 140 continues to be contained in Appliance A1 102 and be executed by Hypervisor 134 on Processing Circuitry 110.

In some embodiments, Storage Controller 138 may determine whether performing Requested Compute Migration 167 would cause VM-1 140 to experience an increased remote data storage I/O performance penalty as a result of moving VM-1 140 to Appliance A2 102 at least in part by calculating a source remote data storage I/O performance penalty that is equal to a rate at which remote data storage I/O is performed by VM-1 140 when VM-1 140 is executing in Appliance A1 102, calculating a destination remote data storage I/O performance penalty that is equal to a rate at which remote data storage I/O would be performed by VM-1 140 as a result of moving VM-1 140 to Appliance A2 104, and determining that performing Requested Compute Migration 167 would cause VM-1 140 to experience an increased remote data storage I/O performance penalty as a result of moving VM-1 140 to Appliance A2 104 in response at least in part to the destination remote data storage I/O performance penalty exceeding the source remote data storage I/O performance penalty.

In some embodiments, Storage Controller 138 may calculate the source remote data storage I/O performance penalty at least in part by identifying those storage volumes allocated to VM-1 140 that are remote storage volumes of VM-1 140 when VM-1 140 is executing in Appliance A1 102, and may calculate the destination remote data storage I/O performance penalty at least in part by identifying those storage volumes allocated to VM-1 140 that would be remote storage volumes of VM-1 140 as a result of moving VM-1 140 to Appliance A2 104.

In some embodiments, Storage Controller 138 may monitor I/O throughput generated by VM-1 140 to each storage volume allocated to VM-1 140. Storage Controller 138 may calculate the source remote data storage I/O performance penalty at least in part by calculating a total amount of I/O throughput generated by VM-1 140 to those storage volumes allocated to VM-1 140 that are remote storage volumes of VM-1 140 when VM-1 140 is executing in Appliance A1 102. Storage Controller 138 may calculate the destination remote data storage I/O performance penalty at least in part by calculating a total amount of the I/O throughput generated by VM-1 140 to those storage volumes allocated to VM-1 140 that would be remote storage volumes of VM-1 140 as a result of moving VM-1 140 to Appliance A2 104.

In some embodiments in which Storage Controller 138 monitors the I/O throughput generated by VM-1 140 to each storage volume allocated to VM-1 140, the disclosed technology may detect a maximum rate at which Network Interface 116 of Appliance A1 102 can transfer data onto Network 108, e.g. by querying Network Interface 116. Storage Controller 138 may further detect a maximum rate at which Network Interface 124 can transfer data onto Network 108, e.g. by querying Network Interface 124. In such embodiments, Storage Controller 138 may calculate the source remote data storage I/O performance penalty as a value that includes or consists of a) the total amount of I/O throughput generated by VM-1 140 to those storage volumes allocated VM-1 140 that are remote storage volumes of VM-1 140 when VM-1 140 is executing in Appliance A1 102, divided by b) the maximum rate at which Network Interface 116 of Appliance A1 102 can transfer data onto Network 108. Storage Controller 138 may further calculate the destination remote data storage I/O performance penalty as a value that includes or consists of a) the total amount of I/O throughput generated by VM-1 140 to those storage volumes allocated to VM-1 140 that would be remote storage volumes of VM-1 140 as a result of moving VM-1 140 to Appliance A2 104, divided by b) the maximum rate at which Network Interface 124 of Appliance A2 104 can transfer data onto the Network 108.

In some embodiments, Storage Controller 138 may determine a source compute latency that includes or consists of a compute latency experienced by VM-1 140 when VM-1 140 is executing on Appliance A1 102. Storage Controller 138 may further determine a destination compute latency that includes or consists of a compute latency that would be experienced by VM-1 140 as a result of moving VM-1 140 to Appliance A2 104. Storage Controller 138 may then calculate a source performance index that is equal to a sum of the source compute latency and the source remote data storage I/O performance penalty, and calculate a destination performance index equal to a sum of the destination compute latency and the destination remote data storage I/O performance penalty. Storage Controller 138 may prevent Requested Compute Migration 167 from being performed in response at least in part to the destination performance index exceeding the source performance index.

For example, by monitoring the I/O operations issued to each storage volume in HCI Environment 100, Storage Controller 138 may determine and store an amount of throughput for each storage volume as follows:

Storage Volume Throughput (TP)=X bps (bits of data transferred between the virtual machine and the storage volume per second)

Storage Controller 138 may also obtain (e.g. read from each network interface) and store a maximum rate at which each network interface in HCI Environment 100 transfers data onto Network 108 as follows:

Maximum Data Transfer Rate (Port Speed)=Y bps (maximum number of bits of data that can be transferred per second onto the Network 108 over the network interface)

Accordingly, when a specific storage volume is not contained in the same appliance as the virtual machine to which it is allocated, Storage Controller 138 may calculate that transferring X bits of data per second between the virtual machine and the storage volume per second incurs a remote data storage I/O performance penalty of X/Y bits per second for that storage volume, where X is the Storage Volume Throughput for that storage volume, and Y is the Maximum Data Transfer Rate for the network interface that is contained in the appliance that contains the virtual machine.

In some embodiments, Storage Controller 138 may further determine whether Requested Compute Migration 167 is consistent with at least one policy provided to and/or stored in Storage Controller 138 for processing compute migration requests. Storage Controller 138 may also further determine whether Requested Compute Migration 167 is permitted or prevented at least in part responsive to determining whether Requested Compute Migration 167 is consistent with the at least one policy provided for processing compute migration requests.

In some embodiments, one or more of the appliances in HCI Environment 100 may include multiple (e.g. two or more) nodes for purposes of failover support. In such embodiments, when one node of a multi-node appliance fails, a failover is performed to enable continued operation using one or more of the non-failing nodes. In such embodiments, each node in a multi-node appliance may, for example, include the features described herein with reference to Appliance A1 102.

While the examples provided herein include reference to the initiation of a compute migration through operation of program code included wholly or partly in part in one or more hypervisors, embodiments of the technology disclosed herein may additionally or alternatively operate in response to initiation of compute migrations in whole or in part from a compute cluster manager. For example, a cluster compute manager may execute in a separate node or appliance within HCI Environment 100 (e.g. wholly or partly outside of Appliance A1 102, Appliance A2 104, and/or Appliance A3 106), and maintain information regarding the operation (performance, topology, etc.) of components in all appliances contained in HCI Environment 100. In such embodiments, compute migration requests may be issued to a storage controller from the cluster compute manager, and responses to the compute migration requests may be issued from a storage controller to the cluster compute manager. Further in such embodiments, a storage controller may obtain information during operation, including various performance and/or topology data (e.g. virtual machine and/or storage volume performance data, storage volume allocations and/or other cluster topology information), from the cluster compute manager.

Figure 2:
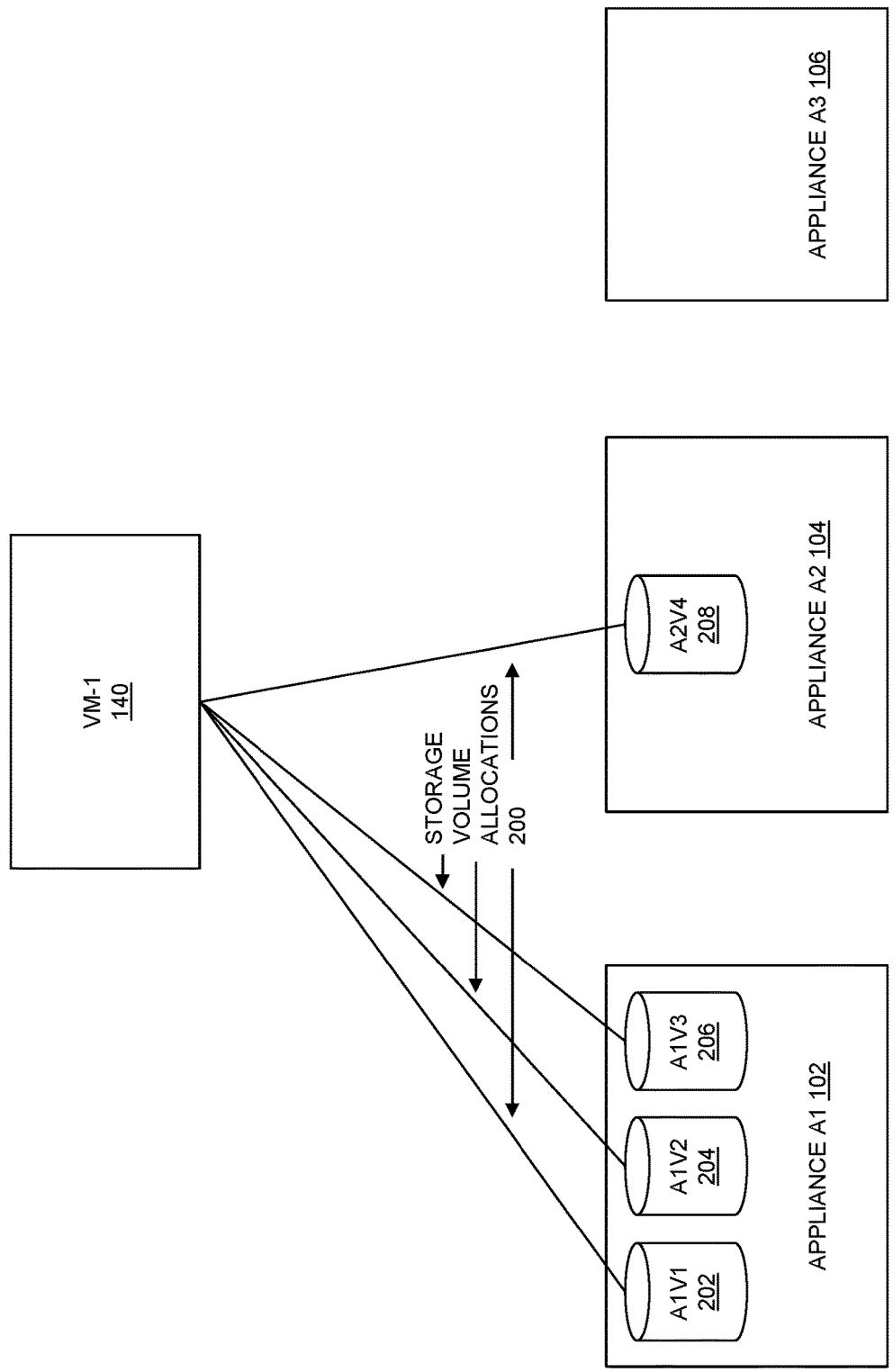
FIG. 2 is a block diagram showing an example of storage volume allocations to a virtual machine for which a compute migration is requested.

FIGS. 2-6 further illustrate the above described example of operation of Storage Controller 138 while receiving and processing the Compute Migration Request 158. FIG. 2 is a block diagram illustrating an example of Storage Volume Allocations 200 to the virtual machine VM-1 140. As shown in the example of FIG. 2, the storage volumes allocated to VM-1 140 may be distributed across multiple (e.g. 2) appliances within the HCI Environment 100. For example, the storage volumes allocated to VM-1 140 may consist of the storage volumes A1V1 202, A1V2 204, and A1V3 206 that are contained in Appliance A1 102, and also the storage volume A2V4 208 that is contained in Appliance A2 104. In the example shown in FIG. 2, no storage volumes contained in Appliance A3 106 are allocated to VM-1 140.

As shown in FIG. 2, because Storage Controller 138 contains indications of which storage volumes are allocated to VM-1 140, and also contains indications of which appliance contains each storage volume, while processing Migration Request 158 Storage Controller 138 detects that performing the Requested Compute Migration 167 would change the storage volumes A1V1 202, A1V2 204, and A1V3 206 from local storage volumes to remote storage volumes. Also while processing Migration Request 158, Storage Controller 138 detects that performing Requested Compute Migration 167 would change storage volume A2V4 208 from a remote storage volume to a local storage volume.

Figure 3:
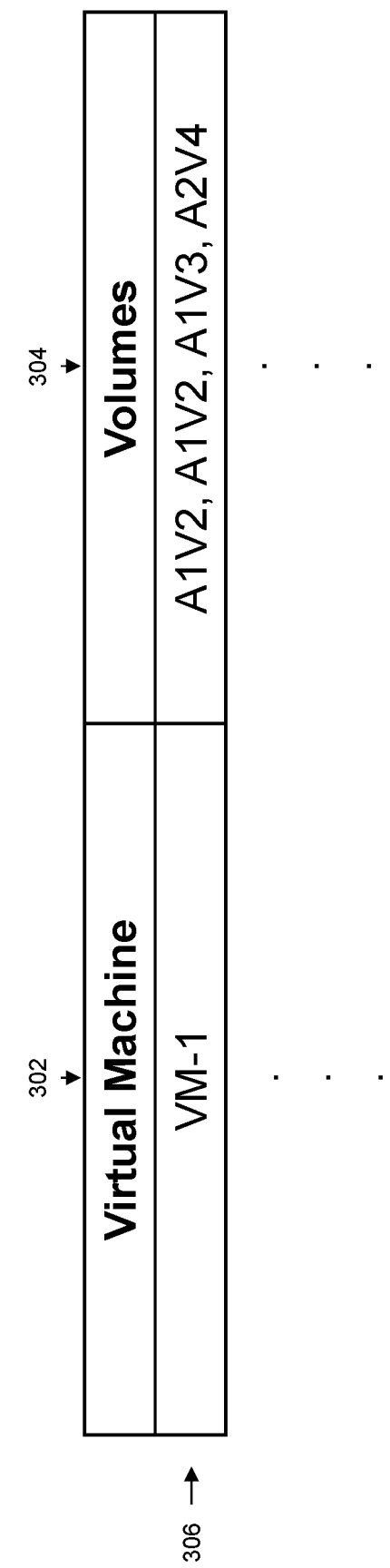
FIG. 3 is a block diagram showing an example of a virtual machine to storage volume association table in some embodiments.

FIG. 3 shows an example of a Virtual Machine to Storage Volume Association Table 300 that may be generated by and contained in Storage Controller 138. As shown in FIG. 3, each row of Virtual Machine to Storage Volume Association Table 300 corresponds to a virtual machine in HCI Environment 100. For example, row 306 corresponds to VM-1 140, as indicated by column 302. Row 306 associates VM-1 140 with storage volumes A1V1 202, A1V2 204, A1V3 206, A2V4 208, as indicated by column 304. In this way, row 306 indicates that the set of storage volumes allocated to VM-1 140 consists of A1V1 202, A1V2 204, A1V3 206, and A2V4 208. While only one row is shown in the example of FIG. 3, those skilled in the art will recognize that the Virtual Machine to Storage Volume Association Table 300 may include a row for each one of the virtual machines in HCI Environment 100.

FIG. 4 shows an example of an Appliance to Port Speed and Storage Volumes Association Table 400 that may be generated by and contained in Storage Controller 138. As shown in FIG. 4, each row of Appliance to Port Speed and Storage Volumes Association Table 400 corresponds to an appliance in HCI Environment 100. For example, as indicated by the contents of column 402, row 408 corresponds to Appliance A1 102, row 410 corresponds to Appliance A2 104, and row 412 corresponds to Appliance A3 106. Each row indicates the maximum data transfer rate for the network interface of the appliance corresponding to the row (e.g. in column 404), and also the specific storage volumes that are contained in that appliance (e.g. in column 406). Accordingly, row 408 indicates that Appliance A1 102 i) has a network interface (i.e. Network Interface 116) with a maximum data transfer rate of S1, and ii) contains storage volumes A1V1 202, A1V2 204, and A1V3 206. Row 410 indicates that Appliance A2 104 i) has a network interface (i.e. Network Interface 124) with a maximum data transfer rate of S2, and ii) contains storage volume A2V4 208. Row 412 indicates that Appliance A3 106 i) has a network interface (i.e. Network Interface 132) with a maximum data transfer rate of S3, and ii) contains no storage volumes. Those skilled in the art will recognize that Appliance to Port Speed and Storage Volumes Association Table 400 may include additional rows in the case where HCI Environment 100 includes additional appliances.

FIG. 5 shows an example of a Throughput by Storage Volume Table 500 that may be generated by and contained in Storage Controller 138. As shown in FIG. 5, each row of Throughput by Storage Volume Table 500 corresponds to a storage volume in HCI Environment 100. For example, as indicated by the contents of column 502, row 506 corresponds to Storage Volume A1V1 202, row 508 corresponds to Storage Volume A1V2 204, row 510 corresponds to Storage Volume A1V3 206, and row 512 corresponds to Storage Volume A2V4 208. Each row indicates (e.g. in column 504) the throughput for the storage volume corresponding to the row. Accordingly, row 506 indicates that Storage Volume A1V1 202 has a throughput of TP1, row 508 indicates that Storage Volume A1V2 204 has a throughput of TP2, row 510 indicates that Storage Volume A1V3 206 has a throughput of TP3, and row 512 indicates that Storage Volume A2V4 208 has a throughput of TP4. Those skilled in the art will recognize that Throughput by Storage Volume Table 500 may include additional rows in the case where HCI Environment 100 includes additional storage volumes.

FIG. 6 shows an example of a Remote Data Storage I/O Performance Penalty Table 600 for VM-1 140 that may be generated by and contained in Storage Controller 138. While the table 600 shown in FIG. 6 is for VM-1 140, Storage Controller 138 may contain a similar table for each virtual machine in HCI Environment 100. As shown in FIG. 6, each row of Remote Data Storage I/O Performance Penalty Table 600 corresponds to a possible execution location (aka a possible "compute location") for VM-1 140 within HCI Environment 100. Accordingly, row 612 stores values that are valid when VM-1 140 is contained in Appliance A1 102, row 614 stores values that are valid when VM-1 140 is contained in Appliance A2 104, and row 616 stores values that are valid when VM-1 140 is contained in Appliance A3 106.

Each row in the table 600 indicates (e.g. in column 604) which storage volumes allocated to VM-1 140 are local storage volumes when VM-1 140 is contained in the appliance corresponding to the row. Accordingly, as indicated by row 612, when VM-1 140 is contained in Appliance A1 102, the local storage volumes for VM-1 140 are A1V1 202, A1V2 204, and A1V3 206. As indicated by row 614, when VM-1 140 is contained in Appliance A2 104, the local storage volumes for VM-1 140 are only A2V4 208. As indicated by row 616, when VM-1 140 is contained in Appliance A3 106, there are no local storage volumes for VM-1 140.

Each row in the table 600 also indicates (e.g. in column 606) which storage volumes allocated to VM-1 140 are remote storage volumes when VM-1 140 is contained in the appliance corresponding to the row. Accordingly, as indicated by row 612, when VM-1 140 is contained in Appliance A1 102, the remote storage volumes for VM-1 140 consist of A2V4 208. As indicated by row 614, when VM-1 140 is contained in Appliance A2 104, the remote storage volumes for VM-1 140 are A1V1 202, A1V2 204, and A1V3 206. As indicated by row 616, when VM-1 140 is contained in Appliance A3 106, the remote storage volumes for VM-1 140 are A1V1 202, A1V2 204, A1V3 206, and A2V4 208.

Each row in the table 600 also indicates (e.g. in column 608) the rate at which remote data storage I/O would be performed by VM-1 140 when VM-1 140 is contained in the appliance corresponding to the row. Accordingly, as indicated by row 612, when VM-1 140 is contained in Appliance A1 102, VM-1 140 performs remote data storage I/O at a rate equal to TP4. As indicated by row 614, when VM-1 140 is contained in Appliance A2 104, VM-1 140 performs remote data storage I/O at a rate equal to TP1+TP2+TP3. As indicated by row 616, when VM-1 140 is contained in Appliance A3 106, VM-1 140 performs remote data storage I/O at a rate equal to TP1+TP2+TP3+TP4.

Each row in the table 600 also indicates (e.g. in column 610) the remote data storage I/O performance penalty experienced by VM-1 140 when VM-1 140 is contained in the appliance corresponding to the row. Accordingly, as indicated by row 612, when VM-1 140 is contained in Appliance A1 102, VM-1 140 experiences a remote data storage I/O performance penalty ($RP_{A1}$) equal to (TP4)/S1. As indicated by row 614, when VM-1 140 is contained in Appliance A2 104, VM-1 140 experiences a remote data storage I/O performance penalty ($RP_{A2}$) equal to (TP1+TP2+TP3)/S2. And as indicated by row 616, when VM-1 140 is contained in Appliance A3 106, VM-1 140 experiences a remote data storage I/O performance penalty ($RP_{A3}$) equal to (TP1+TP2+TP3+TP4)/S3. For example, each remote data storage I/O performance penalty may be expressed as milliseconds/second, and denote the additional time in milliseconds spent every second in order to support the cumulative throughput to remote storage volumes for VM-1 140 using the relevant network interface.

Storage Controller 138 may use the values in column 610 of the Remote Data Storage I/O Performance Penalty Table 600 when processing compute migration requests it receives from Hypervisor 134, such as Migration Request 158. While Hypervisor 134 may generate Migration Request 158 based on an analysis of VM-1 140's compute performance, Hypervisor 134 may not have the ability to analyze the remote data storage I/O performance penalty experienced by VM-1 140 when VM-1 140 is contained in Appliance A1 102, and/or when VM-1 140 is contained in Appliance A2 104. Accordingly, the additional analysis of Requested Compute Migration 167 performed by Storage Controller 138 in response to receipt of Migration Request 158 may effectively combine the compute migration analysis performed by Hypervisor 134 that led to generation of Migration Request 158 with an additional analysis of Requested Compute Migration 167 that is based on remote data storage I/O penalties incurred by VM-1 140 at the source appliance and at the destination appliance of Requested Compute Migration 167, resulting in the impact of performing Requested Compute Migration 167 being evaluated holistically. Storage Controller 138 assumes that the compute migration analysis performed by Hypervisor 134 leading up to the generation of Migration Request 158 ensures that the destination appliance (i.e. Appliance A2 104) has sufficient available processing resources to support execution of VM-1 140 in the event that Requested Compute Migration 167 is performed.

When Storage Controller 138 receives Migration Request 158 from Hypervisor 134, requesting that VM-1 140 be migrated from Appliance A1 102 to Appliance A2 104, as illustrated by Requested Compute Migration 167, Storage Controller 138 may process Migration Request 158 using the contents of the Remote Data Storage I/O Performance Penalty Table 600. For example, Storage Controller 138 may use the contents of column 610 in Table 600 to determine whether moving VM-1 140 from Appliance A1 102 to Appliance A2 104 would result in VM-1 140 experiencing an increased remote data storage I/O penalty. For example, Storage Controller 138 may determine that moving VM-1 140 from Appliance A1 102 to Appliance A2 104 would result in VM-1 140 experiencing an increased remote data storage I/O penalty by comparing $RP_{A1}$ to $RP_{A2}$, and determining that moving VM-1 140 from Appliance A1 102 to Appliance A2 104 would result in VM-1 140 experiencing an increased remote data storage I/O penalty if the requested compute migration were performed in the case where $RP_{A2}$ is greater than $RP_{A1}$. In some configurations or embodiments, as for example in response to one or more policies or the like that may be provided to and/or stored within Storage Controller 138, Storage Controller 138 may operate in response to determining that $RP_{A2}$ is greater than $RP_{A1}$ by preventing Requested Compute Migration 167, e.g. by issuing a Response 160 to Hypervisor 134 that prevents Hypervisor 134 from performing Requested Compute Migration 167. Alternatively, Storage Controller 138 may operate in response to determining that $RP_{A2}$ is not greater than $RP_{A1}$ by permitting Requested Compute Migration 167, e.g. by issuing a Response 160 to Hypervisor 134 that permits Hypervisor 134 to perform Requested Compute Migration 167.

In some configurations or embodiments, for example also in response to one or more performance and/or resource allocation policies or the like that may be provided to and/or stored within Storage Controller 138, Storage Controller 138 may further base its determination of whether Requested Compute Migration 167 is permitted or prevented at least in part by calculating a source performance index and a destination performance index, and preventing Requested Compute Migration 167 from being performed in response to the destination performance index exceeding the source performance index. For example, when Hypervisor 134 issues Migration Request 158, Appliance A2 104 has more processing resources available than Appliance A1 102. Accordingly, performing Requested Compute Migration 167 would improve VM-1 140's compute performance. Storage Controller 138 may operate to estimate the amount of improvement in compute performance that VM-1 140 would experience as a result of Requested Compute Migration 167 using standard queuing theory formulas, based on utilization of processing resources in Appliance A1 102 and Appliance A2 104. Storage Controller 138 may determine a source compute latency experienced by VM-1 140 when VM-1 140 is executing on Appliance A1 104, based on utilization of processing resources in Appliance A1 102, and an estimated destination compute latency that would be experienced by VM-1 140 as a result of moving VM-1 140, based on utilization of processing resources in Appliance A2 104. Moving VM-1 140 to Appliance A2 104 as a result of performing Requested Compute Migration 167 would result in a reduction in processing resource utilization in Appliance A1 102, and an increase in processing resource utilization in Appliance A2 103. Further as a result of performing Requested Compute Migration 167, the remaining workload (e.g. virtual machines) executing in Appliance A1 102 would see an improvement in terms of compute latency, while the workload on the processing resources in Appliance A2 104 would increase, worsening compute latency for VM-1 140.

For example, while processing Migration Request 158 Storage Controller 138 may:

a) Determine that VM-1 140 contributes a utilization of "UVM1" to Appliance A1 102's compute utilization "UA1", b) Determine that Appliance A2 104 has a compute utilization of "UA2", and c) Apply a queuing function f( ) that models compute utilization for an individual appliance.

For example, Appliance A1 102 and Appliance A2 104 may have identical configurations. In such a case, Storage Controller 138 may, while processing Migration Request 158, determine the impact of performing Requested Compute Migration 167 on the compute latency experienced by VM-1 140 as described below.

Storage Controller 138 may determine a source compute latency "L1" that is the compute latency experienced by VM-1 140 when VM-1 140 is contained in and executing on Appliance A1 102 (i.e. before performing Requested Compute Migration 167) as follows:

$$L1=f(UA1)$$

Storage Controller 138 may also determine a destination compute latency "L2" that is the estimated compute latency that would be experienced by VM-1 140 when VM-1 140 is contained in and executing on Appliance A2 104 (i.e. after performing Requested Compute Migration 167) as follows:

$$L2=f(UA2+UVM1)$$

Storage Controller 138 may then determine the change in VM-1 140's performance that would result from performing Requested Compute Migration 167. For example, Storage Controller 138 may apply a function go that outputs VM-1 140's performance index in terms of compute latency and remote data storage JO performance penalty. For example, g( ) may be embodied as an addition of compute latency and remote data storage I/O performance penalty (e.g. the sum of compute latency and remote data storage I/O performance). In such an embodiment, a lower performance index value indicates better performance.

For example, Storage Controller 138 may calculate a source performance index "PerfBefore" for VM-1 140, representing the overall performance of VM-1 140 while VM-1 140 is contained in and executing on Appliance A1 102 (i.e. before performing Requested Compute Migration 167) as follows:

$$\text{PerfBefore} = g(L1, RP_{A1})$$

Further for example, Storage Controller 138 may also calculate a destination performance index "PerfAfter" for VM-1 140, representing the overall performance that would be experienced by VM-1 140 after VM-1 140 was moved to and begun execution in Appliance A2 104 (i.e. after performing Requested Compute Migration 167) as follows:

$$\text{PerfAfter} = g(L2, RP_{A2})$$

In such an embodiment, the net performance change resulting from performing Requested Compute Migration 167 would be:

$$\text{PerfBefore} - \text{PerfAfter}$$

In some embodiments or configurations, if the net performance change resulting from performing Requested Compute Migration 167 is positive (i.e. greater than 0), then the destination performance index exceeds the source performance index, and Storage Controller 138 will respond by preventing Requested Compute Migration 167 from being performed, e.g. by issuing a Response 160 to Hypervisor 134 that prevents Hypervisor 134 from performing Requested Compute Migration 167. If the net performance change resulting from performing Requested Compute Migration 167 is not positive (i.e. is not greater than 0), then the destination performance index does not exceed the source performance index, and Storage Controller 138 will respond by permitting Requested Compute Migration 167 to be performed, e.g. by issuing a Response 160 to Hypervisor 134 that permits Hypervisor 134 to perform Requested Compute Migration 167.

The determination by Storage Controller 138 of whether to permit or prevent a requested compute migration may further depend on whether the requested compute migration is consistent with various specific performance and/or resource allocation policies or the like that may be provided to and/or stored within Storage Controller 138. Such policies may include relative priorities and/or performance requirements assigned to individual or groups of storage devices/logical volumes, and/or to individual or groups of virtual machines. Such priorities and/or performance requirements may, for example, be "hints" that may be provided, configured and/or set by system administrators, customers, etc. In some cases, such priorities and/or performance requirements may cause a requested compute migration to be allowed even in the case where the requested compute migration moves a virtual machine from a source appliance containing all the storage volumes allocated to the virtual machine, to a destination appliance containing none of the storage volumes allocated to the virtual machine. For example, the priorities and/or performance requirements used in this regard may indicate that one or more virtual machines may be migrated without regard to an increase in remote data storage I/O performance penalty. In another example, the priorities and/or performance requirements used in this regard may indicate that one or more virtual machines may be migrated so long as their remote I/O performance penalty does not exceed a corresponding threshold amount, and/or the destination performance index does not exceed a corresponding threshold amount. Other examples may include priorities and/or performance requirements associated with specific storage devices/logical volumes that may determine whether or not a requested compute migration is prevented or permitted.

Figure 7:
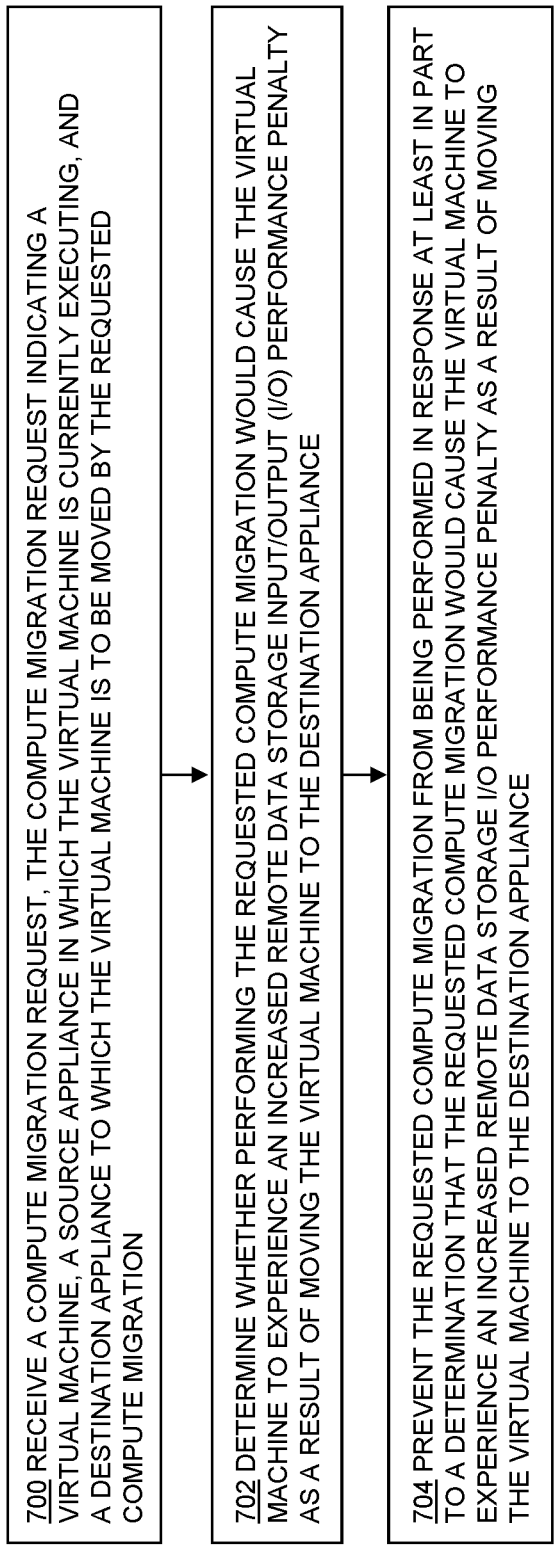
FIG. 7 is a flow chart showing an example of steps that may be performed in some embodiments.

FIG. 7 shows a flow chart showing an example of steps that may be performed in some embodiments. As shown in FIG. 7, at step 700 a compute migration request is received. The compute migration request received at step 700 may indicate a virtual machine that is to be migrated, a source appliance in which the virtual machine is currently executing, and a destination appliance to which the virtual machine is to be moved by the requested compute migration.

At step 702, a determination is made as to whether performing the requested compute migration would cause the virtual machine to experience an increased remote data storage I/O performance penalty as a result of moving the virtual machine to the destination appliance.

At step 704, the requested compute migration is prevented from being performed in response at least in part to a determination that the requested compute migration would cause the virtual machine to experience an increased remote data storage I/O performance penalty as a result of moving the virtual machine to the destination appliance.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer PO attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   monitoring I/O throughput generated by a virtual machine to each storage volume allocated to the virtual machine;
   receiving a compute migration request, the compute migration request indicating the virtual machine, a source appliance in which the virtual machine is currently executing, and a destination appliance to which the virtual machine is to be moved by the requested compute migration;
   detecting a maximum rate at which a network interface of the source appliance can transfer data onto a network, wherein the network interconnects a plurality of appliances including the source appliance and the destination appliance;
   detecting a maximum rate at which a network interface of the destination appliance can transfer data onto the network;
   determining whether performing the requested compute migration would cause the virtual machine to experience an increased remote data storage Input/Output (I/O) performance penalty as a result of moving the virtual machine to the destination appliance, at least in part by:
      calculating a source remote data storage I/O performance penalty that is equal to a rate at which remote data storage I/O is performed by the virtual machine when the virtual machine is executing in the source appliance, by identifying those storage volumes allocated to the virtual machine that are remote storage volumes of the virtual machine when the virtual machine is executing in the source appliance and calculating a total amount of I/O throughput generated by the virtual machine to those storage volumes allocated to the virtual machine that are remote storage volumes of the virtual machine when the virtual machine is executing in the source appliance, wherein the source remote data storage I/O performance penalty comprises the total amount of I/O throughput generated by the virtual machine to those storage volumes allocated to the virtual machine that are remote storage volumes of the virtual machine when the virtual machine is executing in the source appliance divided by the maximum rate at which the network interface of the source appliance can transfer data onto the network,
      calculating a destination remote data storage I/O performance penalty that is equal to a rate at which remote data storage I/O would be performed by the virtual machine as a result of moving the virtual machine to the destination appliance, by identifying those storage volumes allocated to the virtual machine that would be remote storage volumes of the virtual machine as a result of moving the virtual machine to the destination appliance and calculating a total amount of the I/O throughput generated by the virtual machine to those storage volumes allocated to the virtual machine that would be remote storage volumes of the virtual machine as a result of moving the virtual machine to the destination appliance, wherein the destination remote data storage I/O performance penalty comprises the total amount of I/O throughput generated by the virtual machine to those storage volumes allocated to the virtual machine that would be remote storage volumes of the virtual machine as a result of moving the virtual machine to the destination appliance divided by the maximum rate at which the network interface of the destination appliance can transfer data onto the network, and
      determining that performing the requested compute migration would cause the virtual machine to experience an increased remote data storage I/O performance penalty as a result of moving the virtual machine to the destination appliance in response to the destination remote data storage I/O performance penalty exceeding the source remote data storage I/O performance penalty; and
   preventing the requested compute migration from being performed in response at least in part to the determination that the requested compute migration would cause the virtual machine to experience an increased remote data storage I/O performance penalty as a result of moving the virtual machine to the destination appliance.

2. The method of claim 1, further comprising:
   determining a source compute latency, wherein the source compute latency comprises a compute latency experienced by the virtual machine when the virtual machine is executing on the source appliance;
   determining a destination compute latency, wherein the destination compute latency comprises a compute latency that would be experienced by the virtual machine as a result of moving the virtual machine to the destination appliance;

calculating a source performance index equal to a sum of the source compute latency and the source remote data storage I/O performance penalty;

calculating a destination performance index equal to a sum of the destination compute latency and the destination remote data storage I/O performance penalty; and preventing the requested compute migration from being performed in response to the destination performance index exceeding the source performance index.

3. The method of claim 1, further comprising:

determining whether the requested compute migration is consistent with at least one policy provided for processing compute migration requests; and determining whether the requested compute migration should be prevented responsive to determining whether the requested compute migration is consistent with the at least one policy provided for processing compute migration requests.

4. A hyper-converged infrastructure (HCI) appliance, comprising:

processing circuitry;

a memory coupled to the processing circuitry, the memory storing program code which, when executed by the processing circuitry, causes the processing circuitry to:

monitor I/O throughput generated by a virtual machine to each storage volume allocated to the virtual machine;

receive a compute migration request, the compute migration request indicating the virtual machine, a source appliance in which the virtual machine is currently executing, and a destination appliance to which the virtual machine is to be moved by the requested compute migration;

detect a maximum rate at which a network interface of the source appliance can transfer data onto a network, wherein the network interconnects a plurality of appliances including the source appliance and the destination appliance;

detect a maximum rate at which a network interface of the destination appliance can transfer data onto the network;

determine whether performing the requested compute migration would cause the virtual machine to experience an increased remote data storage Input/Output (I/O) performance penalty as a result of moving the virtual machine to the destination appliance, at least in part by causing the processing circuitry to:

calculate a source remote data storage I/O performance penalty that is equal to a rate at which remote data storage I/O is performed by the virtual machine when the virtual machine is executing in the source appliance, by identifying those storage volumes allocated to the virtual machine that are remote storage volumes of the virtual machine when the virtual machine is executing in the source appliance and calculating a total amount of I/O throughput generated by the virtual machine to those storage volumes allocated to the virtual machine that are remote storage volumes of the virtual machine when the virtual machine is executing in the source appliance, wherein the source remote data storage I/O performance penalty comprises the total amount of I/O throughput generated by the virtual machine to those storage volumes allocated to the virtual machine that are remote storage volumes of the virtual machine when the virtual machine is executing in the source appliance divided by the maximum rate at which the network interface of the source appliance can transfer data onto the network, calculate a destination remote data storage I/O performance penalty that is equal to a rate at which remote data storage I/O would be performed by the virtual machine as a result of moving the virtual machine to the destination appliance, by identifying those storage volumes allocated to the virtual machine that would be remote storage volumes of the virtual machine as a result of moving the virtual machine to the destination appliance and calculating a total amount of the I/O throughput generated by the virtual machine to those storage volumes allocated to the virtual machine that would be remote storage volumes of the virtual machine as a result of moving the virtual machine to the destination appliance, wherein the destination remote data storage I/O performance penalty comprises the total amount of I/O throughput generated by the virtual machine to those storage volumes allocated to the virtual machine that would be remote storage volumes of the virtual machine as a result of moving the virtual machine to the destination appliance divided by the maximum rate at which the network interface of the destination appliance can transfer data onto the network, and determine that performing the requested compute migration would cause the virtual machine to experience an increased remote data storage I/O performance penalty as a result of moving the virtual machine to the destination appliance in response to the destination remote data storage I/O performance penalty exceeding the source remote data storage I/O performance penalty; and prevent the requested compute migration from being performed in response at least in part to the determination that the requested compute migration would cause the virtual machine to experience an increased remote data storage I/O performance penalty as a result of moving the virtual machine to the destination appliance.

5. The HCI appliance of claim 4, wherein the program code, when executed, further causes the processing circuitry to:

determine a source compute latency, wherein the source compute latency comprises a compute latency experienced by the virtual machine when the virtual machine is executing on the source appliance;

determine a destination compute latency, wherein the destination compute latency comprises a compute latency that would be experienced by the virtual machine as a result of moving the virtual machine to the destination appliance;

calculate a source performance index equal to a sum of the source compute latency and the source remote data storage I/O performance penalty;

calculate a destination performance index equal to a sum of the destination compute latency and the destination remote data storage I/O performance penalty; and prevent the requested compute migration from being performed in response to the destination performance index exceeding the source performance index.

6. The HCI appliance of claim 4, wherein the program code, when executed, further causes the processing circuitry to:
  determine whether the requested compute migration is consistent with at least one policy provided for processing compute migration requests; and
  determine whether the requested compute migration should be prevented responsive to determining whether the requested compute migration is consistent with the at least one policy provided for processing compute migration requests.

7. A computer program product, comprising:
a non-transitory computer readable medium storing program code, which when carried out by processing circuitry, causes the processing circuitry to perform a method of:
  monitoring I/O throughput generated by a virtual machine to each storage volume allocated to the virtual machine;
  receiving a compute migration request, the compute migration request indicating the virtual machine, a source appliance in which the virtual machine is currently executing, and a destination appliance to which the virtual machine is to be moved by the requested compute migration;
  detecting a maximum rate at which a network interface of the source appliance can transfer data onto a network, wherein the network interconnects a plurality of appliances including the source appliance and the destination appliance;
  detecting a maximum rate at which a network interface of the destination appliance can transfer data onto the network;
  determining whether performing the requested compute migration would cause the virtual machine to experience an increased remote data storage Input/Output (I/O) performance penalty as a result of moving the virtual machine to the destination appliance, at least in part by:
    calculating a source remote data storage I/O performance penalty that is equal to a rate at which remote data storage I/O is performed by the virtual machine when the virtual machine is executing in the source appliance, by identifying those storage volumes allocated to the virtual machine that are remote storage volumes of the virtual machine when the virtual machine is executing in the source appliance and calculating a total amount of I/O throughput generated by the virtual machine to those storage volumes allocated to the virtual machine that are remote storage volumes of the virtual machine when the virtual machine is executing in the source appliance, wherein the source remote data storage I/O performance penalty comprises the total amount of I/O throughput generated by the virtual machine to those storage volumes allocated to the virtual machine that are remote storage volumes of the virtual machine when the virtual machine is executing in the source appliance divided by the maximum rate at which the network interface of the source appliance can transfer data onto the network,
    calculating a destination remote data storage I/O performance penalty that is equal to a rate at which remote data storage I/O would be performed by the virtual machine as a result of moving the virtual machine to the destination appliance, by identifying those storage volumes allocated to the virtual machine that would be remote storage volumes of the virtual machine as a result of moving the virtual machine to the destination appliance and calculating a total amount of the I/O throughput generated by the virtual machine to those storage volumes allocated to the virtual machine that would be remote storage volumes of the virtual machine as a result of moving the virtual machine to the destination appliance, wherein the destination remote data storage I/O performance penalty comprises the total amount of I/O throughput generated by the virtual machine to those storage volumes allocated to the virtual machine that would be remote storage volumes of the virtual machine as a result of moving the virtual machine to the destination appliance divided by the maximum rate at which the network interface of the destination appliance can transfer data onto the network, and
    determining that performing the requested compute migration would cause the virtual machine to experience an increased remote data storage I/O performance penalty as a result of moving the virtual machine to the destination appliance in response to the destination remote data storage I/O performance penalty exceeding the source remote data storage I/O performance penalty; and
  preventing the requested compute migration from being performed in response at least in part to a determination that the requested compute migration would cause the virtual machine to experience an increased remote data storage I/O performance penalty as a result of moving the virtual machine to the destination appliance.

8. The computer program product of claim 7, wherein the method caused to be performed by the processing circuitry further comprises:
  determining a source compute latency, wherein the source compute latency comprises a compute latency experienced by the virtual machine when the virtual machine is executing on the source appliance;
  determining a destination compute latency, wherein the destination compute latency comprises a compute latency that would be experienced by the virtual machine as a result of moving the virtual machine to the destination appliance;
  calculating a source performance index equal to a sum of the source compute latency and the source remote data storage I/O performance penalty;
  calculating a destination performance index equal to a sum of the destination compute latency and the destination remote data storage I/O performance penalty; and
  preventing the requested compute migration from being performed in response to the destination performance index exceeding the source performance index.

* * * * *